April 17, 1962  H. H. HAMMERSTROM ET AL  3,030,534
SINGLE PHASE ALTERNATING CURRENT MOTOR
Filed May 24, 1960  2 Sheets-Sheet 1

HENRY H. HAMMERSTROM
LEE B. WOODRUFF
INVENTORS

BY William P. Green
ATTORNEY

April 17, 1962 H. H. HAMMERSTROM ET AL 3,030,534
SINGLE PHASE ALTERNATING CURRENT MOTOR
Filed May 24, 1960 2 Sheets-Sheet 2

HENRY H. HAMMERSTROM
LEE B. WOODRUFF
INVENTORS

BY William P. Green
ATTORNEY

United States Patent Office 3,030,534
Patented Apr. 17, 1962

3,030,534
SINGLE PHASE ALTERNATING
CURRENT MOTOR
Henry H. Hammerstrom, 4759 Mendota Ave., and Lee B. Woodruff, 5132 Arlington Ave., both of Los Angeles, Calif.
Filed May 24, 1960, Ser. No. 31,377
7 Claims. (Cl. 310—185)

This invention relates to an improved type of electric motor having certain starting torque and efficiency characteristics which have not been attained in prior motor structures.

In a single phase alternating current motor, particularly one of the brushless type, it is very difficult to attain any very great starting torque. In order to provide for a substantial starting torque in most alternating current motors, it is customary to utilize special starting windings, capacitors, or the like, together with starting switches which act centrifugally or otherwise to automatically convert the motor from a starting condition to an entirely different running condition when a predetermined speed is attained. Such switches and other special starting apparatus unduly complicate the motor, greatly increase the possibility of operational difficulties, do not, even when used, provide a really strong starting torque, reduce the overall efficiency of the motor, and in general are far less satisfactory than would be desired. For very small motors, shaded poles and other similar arrangements which do not switch from a starting condition to an operating condition have been employed, but these are even less efficient than the starting switch structures, and can not possibly be employed in motors of any size. A major object of the present invention is to provide a unique type of stator winding arrangement which is capable of operation on single phase alternating current, and which will develop much greater starting torque than has been possible with conventional single phase A.C. motors. A stator designed in accordance with the present invention can develop this very high starting torque without the necessity for any type of switching of the circuit between a special starting condition and a subsequent normal operating condition. Further, the arrangement attains very high operating efficiencies in both the starting and operating conditions, and as a result can be utilized in very large motors which have heretofore invariably required switching mechanisms because of the inefficiencies which have always accompanied previously proposed types of non-switching single phase A.C. motors.

To attain the above results, I utilize a novel arrangement of windings, preferably in conjunction with a capacitor which may be permanently connected into the circuit, and need not be disconnected from the circuit after starting of the motor. More particularly, the stator has a series of first windings which are positioned at different circularly offset locations and act when energized to form a plurality of magnetic stator poles which are alternately north and south. Associated with one of the first windings, there is provided a second winding which is contained predominantly within the circular extent of the mentioned first winding, and is desirably connected in series therewith, with the capacitor if present being connected across the second winding but not across the first. Also, there is a third winding associated with the same first winding but having its electrical center offset therefrom a circular distance which is substantial but is less than 180 electrical degrees (preferably 90 electrical degrees). For best operation, each of the various first windings has associated with it one of the second windings and one of the third windings, in the relationship mentioned. The capacitor may then be connected across all of the "second windings." Best results are attained when the "first windings" are much heavier than (have more turns than) the other associated windings, and when each "second winding" is a distributed winding, distributed within the circular extent of the associated first winding. Also, the "third windings" are for best operation distributed type windings.

The rotor associated with the stator of the present invention may be a simple squirrel cage rotor, or virtually any other type of conventional rotor. If desired, it is possible to employ a wound rotor, having a commutator and brushes.

The above and other features and objects of the present invention will be better understood from the following detailed description of the typical embodiments illustrated in the accompanying drawings in which.

Figure 1:
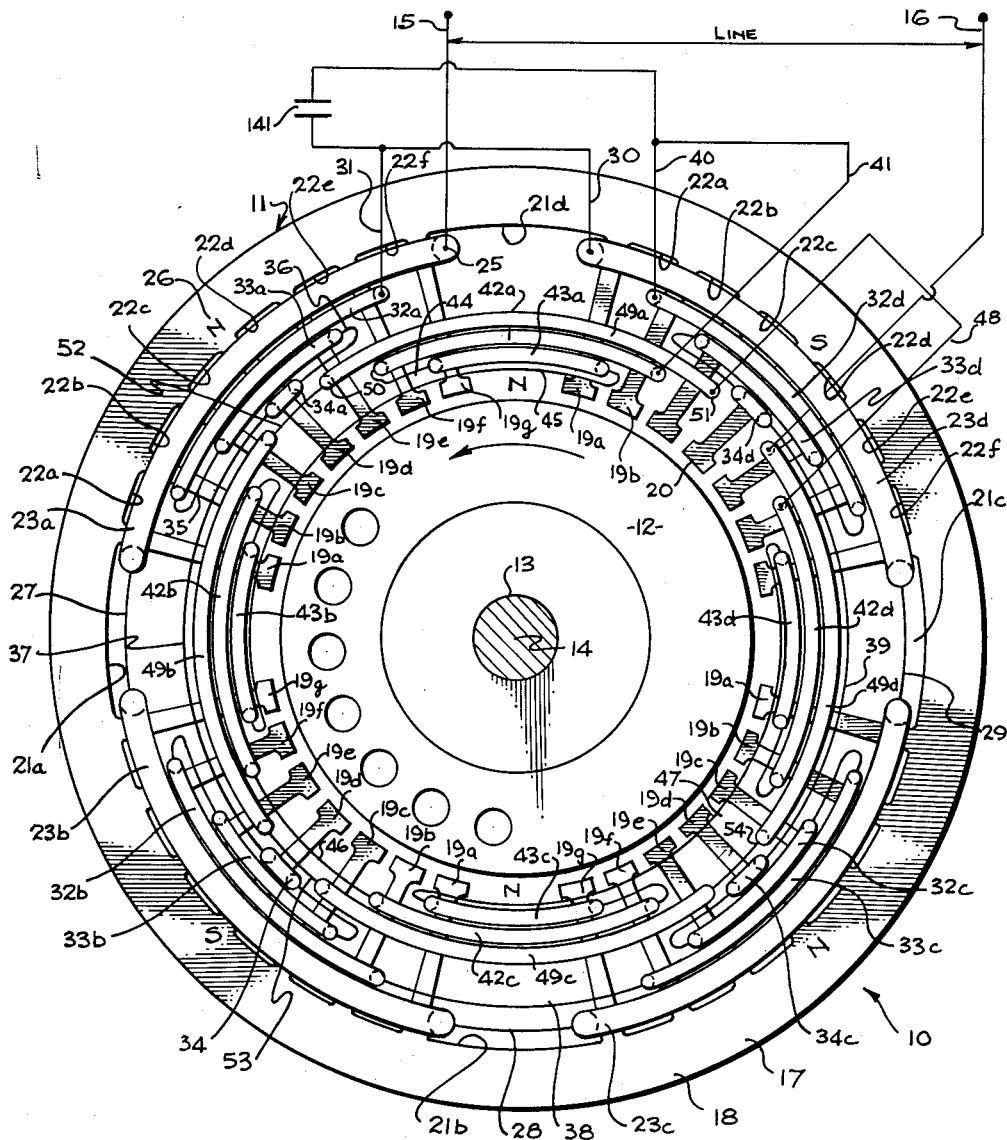
FIG. 1 is a partially diagrammatic side view of a motor embodying the invention.

Referring first to FIG. 1, I have shown at 10 a single phase alternating current electric motor constructed in accordance with the invention, and including an outer stator section 11, and a rotor 12 turning within the stator. The rotor 12 may typically be considered as a conventional squirrel cage induction rotor, having a shaft 13 journalled for rotation about the axis 14 of the motor. It will be understood, however, that other types of rotors may be employed with the illustrated stator. The power supply connections to the motor are represented at 15 and 16, and may be connected to any suitable source of single cycle alternating current, say for example 110 volt, 220 volt or 440 volt, and typically 60 cycle.

The stator includes a body 17 formed of suitable magnetizable material, such as soft iron, and should preferably be formed of a number of identical laminations abutting axially together and tightly secured together in the manner which is conventional in electric motors. Since this laminated type of construction is conventional and well known in the art, no effort has been made to illustrate it specifically, but instead, we have shown only the cross-sectional configuration of the stator body, as it appears from one end of the stator. It will be understood that the body has a substantial thickness, and has this same cross-sectional configuration through that entire thickness.

The stator has an outer annular portion 18 from which a plurality of pole elements 19a, 19b, 19c, 19d, 19e, 19f and 19g project radially inwardly. These pole elements are integral with the outer annular portion 18 of the stator, and have radially inner partial cylindrical surfaces 20, defining together a cylinder of a diameter slightly greater than the external diameter of rotor 13, and therefore in close proximity to the rotor to form a proper magnetic circuit through the rotor and stator. The elements 19a, 19b, etc. may be widened somewhat at their radially inner ends, as shown. The pole elements are arranged in a plurality of groups of the elements, one group for each pole of the motor. That is, if the motor is a four pole device, there are four groups of the pole elements. A four pole motor is typically illustrated in the drawings, though it will be apparent that different numbers of poles may be employed as desired. Successive groups are separated by relatively wide gaps or slots 21a, 21b, 21c, and 21d, while the individual pole elements 19a, 19b to 19g of each group are separated by narrower slots or recesses 22a, 22b, 22c, 22d, 22e and 22f. In the illustrated arrangement, each group of pole elements consists of seven such elements.

The various windings of the stator are received within the different slots formed between the pole elements. A major portion of the novelty of the present invention resides in the unique arrangement of the windings within these slots. The windings include four relatively large heavy windings represented at 23a, 23b, 23c and 23d. Each of these windings extends entirely about one of the four groups of pole elements, with the opposite ends of the winding being received within two of the main wide gaps or slots 21a, 21b, 21c or 21d. For example, the winding 23a is connected at one end to power supply lead 15, and then may be considered as first extending along one side of the associated group of pole elements to the location designated 24 within wide slot 21a, so that the wire may then extend parallel to axis 14 within slot 21a to the opposite side of the stator, and then return along that opposite side of the associated poles to the location 25 at which the coil extends within slot 21d across the thickness of the stator to again return along the first side of the stator toward the location 24. This loop is continued through a large number of turns about the associated pole elements, to form a rather strong coil tending to magnetize all of the contained pole elements in the same manner. That is, when the alternating current flowing through this coil is flowing in a first direction, then coil 23a tends to cause all of the contained pole elements 19a, 19b, etc. to assume north polarity, as indicated by the capital letter N at 26 in FIG. 1, and then when the alternating current reverses its direction of flow, the polarity of that group of pole elements will be changed to south magnetic polarity.

As mentioned, the first end of coil 23a is connected to the power supply lead 15. The second end of the coil is connected by a wire represented at 27 to the next successive coil corresponding to coil 23a. This next successive coil is designated in the drawing as coil 23b, and may be identical with coil 23a except that coil 23b extends about the second series of pole elements rather than the first, and the coil 23b is connected to coil 23a reversely, so that while coil 23a is magnetizing the first set of poles to north polarity, coil 23b is causing the second set of poles to have south polarity. Similarly, coils 23c and 23d are also identical with coil 23a, except that they extend about the third and fourth sets of pole elements, and they are connected in series with the other two coils in a manner such that current flows in coil 23c in the same direction as in coil 23a, relative to the rotor, so that the polarity produced by coil 23c is the same as that produced by coil 23a, while the polarity produced by coil 23d is the same as that produced by coil 23b. To form this series circuit, the second end of coil 23b is connected by wire 28 to a first end of coil 23c, while the second end of coil 23c is connected by wire 29 to the first end of coil 23d. The second end of coil 23d is connected to a lead represented at 30.

After the current flows through the four large coils 23a, 23b, etc., it is then conducted through lead 30 and a connected lead 31 to a series of distributed windings associated with the four first mentioned coils respectively. For example, the distributed winding associated with the first set of pole elements and the first large coil 23a is represented as including three series connected small windings 32a, 33a, and 34a of progressively decreasing circular extent. Coil 32a extends about poles 19b, 19c, 19d, 19e and 19f. More specifically, this coil extends first along one side of these pole elements, then extends parallel to axis 14 within slot 22a, following which the coil returns along the opposite sides of the poles to extend axially in the opposite direction within slot 22f. This is continued through a substantial number of turns, to cause magnetic polarity within the contained pole elements whenever current flows through the coil. A first end of coil 32a is connected to lead 31, while the second end of the coil is connected through a lead 35 to a first end of coil 33a. This coil 33a extends about only the three pole elements 19c, 19d and 19e, with the opposite axially extending end portions of the coil being received within slots 22b and 22e. The second end of coil 33a is connected through lead 36 to the small coil 34a, which may extend only about the single pole element 19d, with the axially extending portions of the coil being received within slots 22c and 22d. The second end of coil 34a is connected to a lead 37 extending to the next group of pole elements. All of the coils 32a, 33a, and 34a forming the distributed winding within the circular extent of coil 23a are wound in a direction to produce the same polarity as that produced by the associated coil 23a.

Within coil 23b, there is the second distributed winding 32b, 33b, 34b which may be identical with the first discussed distributed winding, and is connected in series therewith but reversely, to produce polarity which is the reverse of that produced by distributed winding 32a, 33a, 34b, but is the same as the polarity of coil 23b. Similarly, each of the two additional large windings 23c and 23d has a distributed winding of this same type associated therewith (windings 32c, 33c, 34c and 32d, 33d, 34d). These windings are connected in series with the other two distributed windings by conductors 38 and 39, and each distributed winding is connected to the other windings in a manner such as to produce the same polarity as the large winding 23c or 23d with which it is associated. After the current leaves the final portion 32d of the fourth distributed winding, the current flows into a lead 40. Connected across the series of four distributed windings, there is a capacitor 141, which is in parallel with the series of distributed windings, but is not in parallel with the four larger windings 23a, 23b, etc.

From lead 40, the current flows through a connected lead 41 to a distributed winding which extends between two of the different groups of pole elements, and which consists of two coils represented at 42a and 43a. Coil 42a extends about two of the final poles 19f and 19g of one set of pole elements, and the two first poles 19a and 19b of an adjacent set of pole elements, with the opposite end portions of the coil being received within one of the grooves 22e and one of the grooves 22b respectively. This coil 42a thus tends to magnetize the four encircled pole elements whenever current flows through 42a. A first end of coil 42a is connected to lead 41, while the second end is connected at 44 to the second portion 43a of distributed winding 42a—43a. Coil 43a has its opposite end portions received within and extending axially within the slot 22a of one set of pole elements, and the slot 22f of an adjacent set of pole elements, with the coil extending about only one pole element of each group. The second end of coil 43a is connected by a lead 45 to the two coils 43b and 42b of a second distributed winding which bridges portions of two sets of poles at the location of wide slot 21a. Coils 42b and 43b may be identical with coils 42a and 43a, except that they are connected reversely to produce opposite polarity when the same current flows therethrough. At each of the two remaining wide slots 21b and 21c, an additional distributed winding is provided (coils 42c, 43c and 42d, 43d, with all of the distributed windings being identical, but with successive ones being connected reversely to produce opposite polarity. All of course are connected in series, by the leads represented at 46 and 47, and with the final end of coil 42b being connected to a lead 48.

From lead 48, the current is fed into a coil 49a having a rather large circular extent, within which circular extent the distributed winding 42a—43a is contained. The opposite axially extending ends of coil 49a may be received at 50 and 51 within the slot 22d of one set of pole elements and the slot 22c of a second set of pole elements. Thus, coil 49a extends about and magnetizes three of the pole emements 19e, 19f and 19g of one set of pole elements, and three pole elements 19a, 19b and 19c of the next successive set. Similar coils 49b, 49c and 49d bridge across the adjacent ends of successive groups of pole elements at the locations of wide slots 21a, 21b and 21c. The windings 49a, 49b, 49c and 49d are all identical, and are connected in series by leads 52, 53 and 54, but with alternate coils being wound reversely to produce opposite magnetic polarities. The final end of the fourth coil 49d is connected to the second side 16 of the A.C. power source.

To recapitulate again the relationship between the directions in which the different coils are wound, assume that current is flowing through winding 32a in a direction to produce north magnetic polarity at the radially inner ends of the pole elements contained within that winding. When current is flowing in this direction, the current within windings 32a, 33a and 34a is also in a direction to produce north magnetic polarity, and the current within coils 42a, 43a and 49a is similarly in a direction tending to produce north magnetic polarity within the pole elements encircled by these windings. The direction of current flow within windings 23b, 32b, 33b, 34b, 42b, 43b and 49b is such as to produce south magnetic polarity, the direction of current flow in coils 23c, 32c 33c, 34c, 42c, 43c and 49c tends to produce north polarity, while the current in coils 23d, 32d, 33d, 34d, 42d, 43d and 49d tends to produce south polarity.

Figure 3:
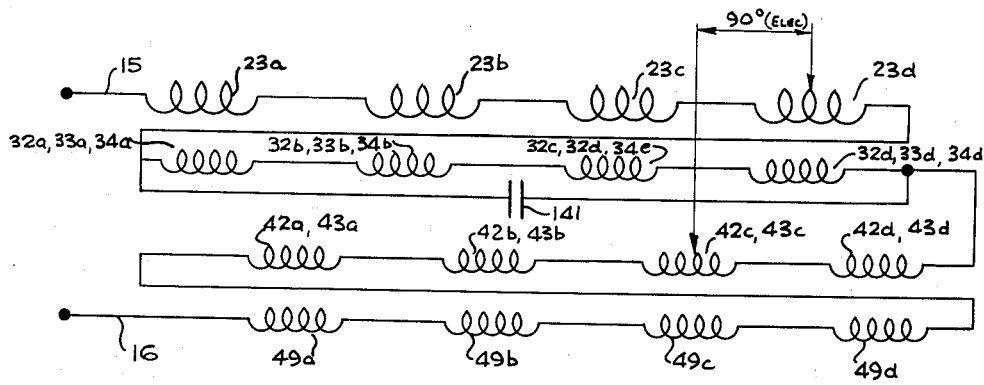
FIG. 3 is a second and different type of diagrammatic representation of the stator coil circuit.
Figure 2:
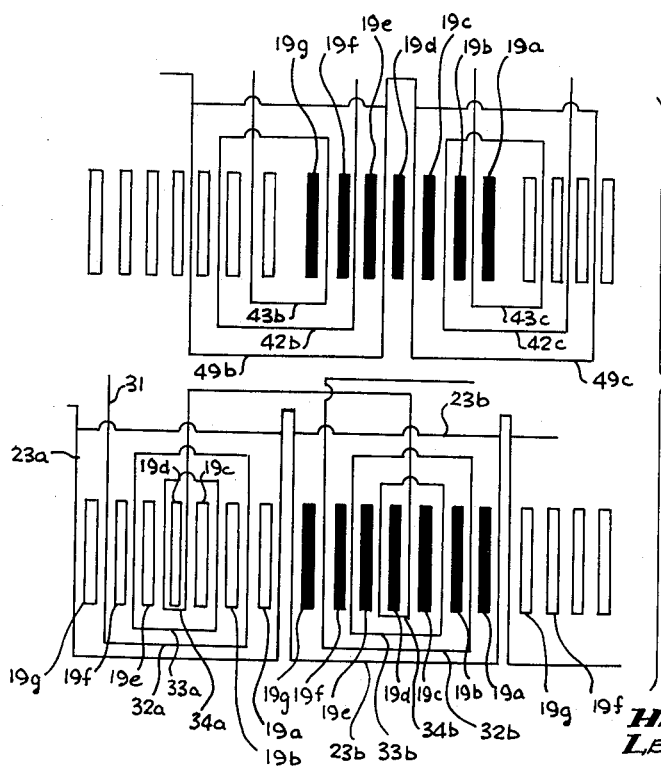
FIG. 2 is a diagrammatic representation of the windings on the stator of the FIG. 1 motor.

FIGS. 2 and 3 are diagrammatic representations of the relationships between the different windings on the stator of FIG. 1, to bring out better the novelty of the invention. In the lower portion of FIG. 2, one of the groups of pole elements of the stator has been darkened to differentiate it from the adjacent pole elements. In this lower half of FIG. 2, only the relatively large windings 23a and 23b, and the distributed windings therein (32a, 33a, 34a and 32b, 33b, 34b) are shown. For clarity of illustration, the same pole elements have been represented in the upper portion of FIG. 2, but with the circularly offset windings 49b, 42b, 43b, 49c, 42c and 43c being shown in that upper portion of FIG. 2, without the windings shown in the lower portion. This diagrammatic representation of FIG. 2 illustrates the offset relationship of the windings, which is such that the coils shown in the upper portion of FIG. 2 have their centers offset 90 electrical degrees from the centers of the coils shown in the lower portion of FIG. 2.

FIG. 3 brings out clearly the manner in which all of the coils are connected in series, with the capacitor 41 being shunted across the four distributed windings 32a, 33a, 34a, etc. Also, FIG. 3 brings out the 90 degree offset relationship of certain of the coils with respect to others of the coils.

For optimum operation of the motor, it is preferred that the outer coils 23a, 23b, 23c and 23d all have more turns of wires than any of the other individual coils of the motor. Desirably, coil 23a has at least about three-fourths as many turns, and preferably approximately as many turns as, all of the contained distributed winding coils 32a, 33a and 34a together. The same is true of the relationship between each of the other main coils 23b, 23c and 23d and their contained distributed windings 32b, 33b, 34b, 32c, 33c, 34c, and 32d, 33d, 34d. Also, it is found desirable in many cases that coil 23a have at least about three-fourths as many turns as the distributed offset winding 42a—43a, with the winding 49a being somewhat fewer turns. The same relationships should occur between the other coils corresponding to these in the motor. While it will be apparent that any of numerous different sizes of wire, and different numbers of turns, may be employed satisfactorily under different operating conditions, the following specific example is given to show the number of turns and wire sizes employed in one particular motor which has been constructed in accordance with the invention, and has operated very successfully on 220 volts, 60 cycle alternating current:

(1) Windings 23a, 23b, 23c and 23d—72 turns each of 20 gauge enameled wire;
(2) Distributed winding 32a, 33a, 34a—total of 76 turns of 19 gauge wire;
(3) Distributed winding 32b, 33b, 34b—total of 76 turns of 19 gauge wire;
(4) Distributed winding 32c, 33c, 34c—total of 76 turns of 19 gauge wire;
(5) Distributed winding 32d, 33d, 34d—total of 76 turns of 19 gauge wire;
(6) Windings 49a, 49b, 49c and 49d—34 turns each of 20 gauge wire;
(7) Distributed windings 42a—43a—total of 76 turns of 20 gauge wire;
(8) Distributed windings 42b—43b—total of 76 turns of 20 gauge wire;
(9) Distributed windings 42c—43c—total of 76 turns of 20 gauge wire;
(10) Distributed windings 42d—43d—total of 76 turns of 20 gauge wire;
(11) Capacitor 41—100 microfarads.

In placing the illustrated motor in operation, it is necessary merely to connect the appropriate alternating current power source to the two input leads 15 and 16, and the motor will immediately commence to turn. The starting torque is very great as compared with prior single phase A.C. motors, and there is very little heating of the motor, indicating very high efficiency of operation. The torque at full speed is also high. The 90 degree offsetting of certain of the coils, together with the phase shifting effect produced by the unique relationship between the distributed windings, 32a, 33a, 34a, etc., the surrounding main coils (23a, etc.) connected in series therewith, the large number of turns in the main windings, and the capacitor where employed, produce in effect a rotating magnetic field having much greater effectiveness at turning a rotor, both at low and high speeds, than has been attained in any prior single phase A.C. motor with which I am acquainted. The motor can be used in very large sizes without losing its efficiency and without introducing the high losses which have heretofore prevented the use of single phase A.C. motors in large sizes without special starting apparatus.

Figure 4:
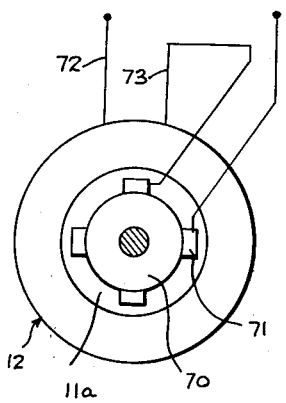
FIG. 4 is a diagrammatic representation of a second form of motor embodying the invention.

FIG. 4 represents diagrammatically a second form of the invention, in which the rotor 11a, instead of being a squirrel cage rotor, is a conventional commutator type wound armature. The commutator is shown at 70, and the associated brushes at 71, with the armature being connected to the A.C. power source 72 in series with the windings of stator 12. These windings of the stator may be substantially the same as those described in connection with FIGS. 1 to 3, and therefore in order to simplify FIG. 4 the actual stator structure and winding arrangement has not been represented in that figure. The two leads 72 and 73 connect into the stator circuit in the same manner as do leads 15 and 16 of FIG. 1, with the stator circuit of course including a capacitor corresponding to that shown at 141 in FIG. 1. In addition to the commutator type rotor of FIG. 4, it is also possible to utilize with the stator any of various other types of rotor, with the rotating magnetic field effect of the stator serving the same function of producing very high starting and operating torque, and extremely high efficiency in all operating conditions, with any rotor which may be employed.

We claim:
1. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, and a plurality of fourth windings associated with different ones of said third windings respectively, each of said fourth windings being disposed within the circular extent of the associated third winding and having a shorter circular extent than said third winding, each of said first windings having at least about three-fourths as many turns as do all of said coils of the associated second winding in combination, the individual first windings having a much greater number of turns than the circularly offset individual third windings.

2. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, and a plurality of fourth windings associated with different ones of said third windings respectively, each of said fourth windings being a distributed winding including a plurality of coils connected in series and disposed within the circular extent of the associated third winding, different ones of said coils of a particular fourth winding being of progressively shorter circular extent within said circular extent of the associated third winding, each of said first windings having at least about three-fourths as many turns as do all of said coils of the associated second winding in combination, the individual first windings having a much greater number of turns than the circularly offset individual third windings.

3. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, and a plurality of fourth windings associated with different ones of said third windings respectively, each of said fourth windings being disposed within the circular extent of the associated third winding and having a shorter circular extent than said third winding, each of said first windings having at least about three-fourths as many turns as do all of said coils of the associated second winding in combination, the individual first windings having a much greater number of turns than the circularly offset individual third windings, all of said first, second, third and fourth windings being connected in series with one another for connection in series to a power source.

4. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, a plurality of fourth windings associated with different ones of said third windings respectively, each of said fourth windings being disposed within the circular extent of the associated third winding and having a shorter circular extent than said third winding, each of said first windings having at least about three-fourths as many turns as do all of said coils of the associated second winding in combination, the individual first windings having a much greater number of turns than the circularly offset individual third windings, and a capacitor connected across said second winding, in parallel therewith, but not across said first, third or fourth windings.

5. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, and a plurality of fourth windings associated with different ones of said third windings respectively, each of said fourth windings being a distributed winding including a plurality of coils connected in series and disposed within the circular extent of the associated third winding, different ones of said coils of a particular fourth winding being of progressively shorter circular extent within said circular extent of the associated third winding, each of said first windings having at least about three-fourths as many turns as do all of said coils of the associated second winding in combination, the individual first windings having a much greater number of turns than the circularly offset individual third windings, all of said first, second, third and fourth windings being connected in series with one another for connection in series to a power source.

6. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first winding, a plurality of third windings having their electrical centers located circularly between successive first windings and having said centers offset approximately 90 electrical degrees from adjacent ones of said first windings, and a plurality of fourth windings associated with different ones of said third windings respectively, each of said fourth windings being disposed within the circular extent of the associated third winding and having a shorter circular extent than said third winding, each of said first windings having at least about three-fourths as many turns as do all of said coils of the associated second winding in combination, the individual first windings having a much greater number of turns than the circularly offset individual third windings, said first winding having at least about three-fourths as many turns as all of the coils of said fourth winding in combination.

7. An electric motor comprising a stator and a rotor, said stator including magnetic metal and electrically energized windings associated therewith for producing rotation of the rotor, said stator windings including a plurality of first windings at different circularly offset locations tending when energized to form a plurality of magnetic stator poles which are alternately north and south, a plurality of second windings associated with different ones of said first windings respectively, each of said second windings being a distributed winding including a plurality of coils connected in series and disposed within the circular extent of the associated first winding, different ones of said coils of a particular second winding being of progressively shorter circular extent within said circular extent of the associated first windings, a plurality of third windings having their electrical centers located circularly between successive first windings and having said centers offset approximately 90 electrical degrees from adjacent ones of said first windings, a plurality of fourth windings associated with different ones of said third windings respectively, each of said fourth windings being a distributed winding including a plurality of coils connected in series and disposed within the circular extent of the associated third winding, different ones of said coils of a particular fourth winding being of progressively shorter circular extent within said circular extent of the associated third winding, each of said first windings having at least about three-fourths as many turns as do all of said coils of the associated second winding in combination, the individual first windings having a much greater number of turns than the circularly offset individual third windings, all of said first, second, third and fourth windings being connected in series with one another for connection in series to a power source, and a capacitor connected across said second winding, in parallel therewith, but not across said first, third or fourth windings, said first winding having at least about three-fourths as many turns as all of the coils of said fourth winding in combination.

References Cited in the file of this patent
UNITED STATES PATENTS

| | | |
|---|---|---|
| 2,671,879 | Schwarz | Mar. 9, 1954 |
| 2,808,554 | Capps | Oct. 1, 1957 |
| 2,874,309 | Staak | Feb. 17, 1959 |